J. H. AND J. MACARTNEY.
CENTRIFUGAL ATTRITIONAL PULVERIZER.
APPLICATION FILED AUG. 19, 1918.
Reissued Dec. 2, 1919.
14,764.
2 SHEETS—SHEET 1.
Fig. 1
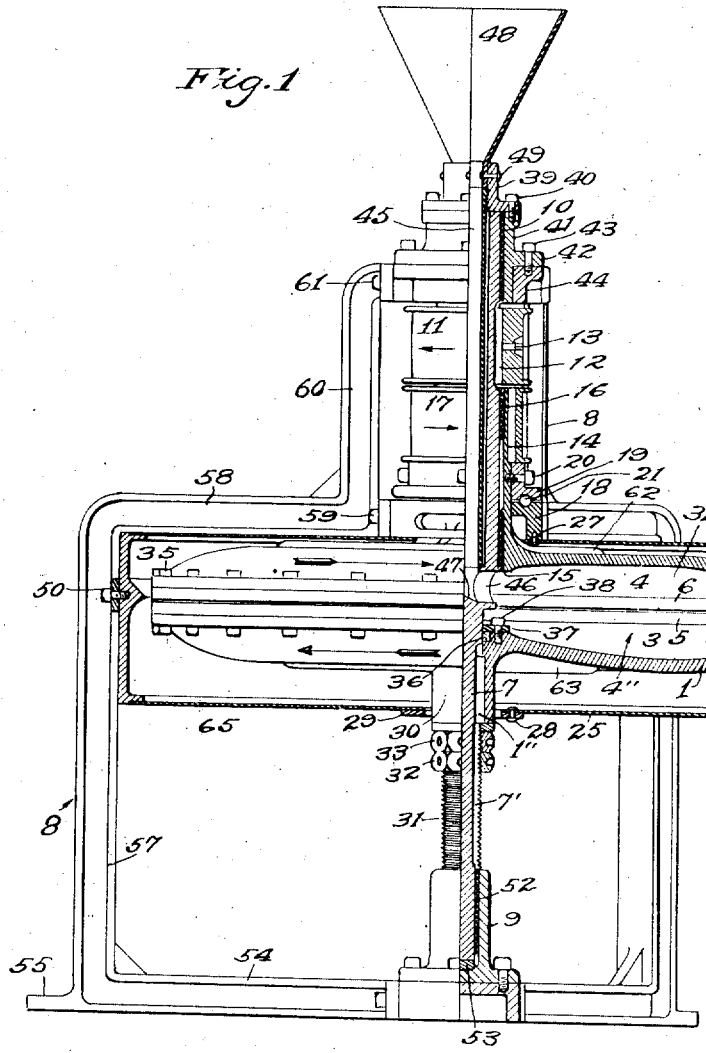
Fig. 2
Fig. 3
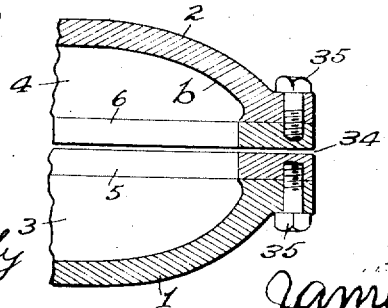
Witness
C. A. Holly
Inventors
John H. Macartney
& Jack Macartney.
James R. Townsend
Their Atty

J. H. AND J. MACARTNEY.

CENTRIFUGAL ATTRITIONAL PULVERIZER.

APPLICATION FILED AUG. 19, 1918.

Reissued Dec. 2, 1919.

14,764.

2 SHEETS—SHEET 2.

Witness
C. C. Holly

Inventors
John H. Macartney
Jack Macartney
by
James R. Townsend
Their Atty.

UNITED STATES PATENT OFFICE.

JOHN H. MACARTNEY AND JACK MACARTNEY, OF LOS ANGELES, CALIFORNIA, ASSIGNORS TO H. T. RUDISILL, TRUSTEE, OF LOS ANGELES, CALIFORNIA.

CENTRIFUGAL ATTRITIONAL PULVERIZER.

14,764. Specification of Reissued Letters Patent. Reissued Dec. 2, 1919.

Original No. 1,253,619, dated January 15, 1918, Serial No. 141,689, filed January 10, 1917. Application for reissue filed August 19, 1918. Serial No. 250,586.

*To all whom it may concern:*

Be it known that we, JOHN H. MACARTNEY and JACK MACARTNEY, both citizens of the United States, residing at Los Angeles, in the county of Los Angeles and State of California, have invented a new and useful Centrifugal Attritional Pulverizer, of which the following is a specification.

This invention relates to a machine adapted to reduce to fineness such materials as ore, clay, quartz, silica, and the like.

An object of the invention is to provide a machine of this kind which will operate at comparatively low speed with high efficiency to reduce to any required fineness broken materials by a grinding action of the pieces of material upon each other with minimum wear upon the machine and with maximum range of product.

The invention relates to the construction of the grinding chamber formed by opposite recessed heads mounted face to face and relatively rotatable, and an object is to so construct the chamber that one or each of the heads impels in the direction of its rotation a portion of the passing material with minimum jamming of the material, so that the grinding is freely effected by an attrition of the meeting surfaces of the relatively moving bodies of material.

The invention is broadly new, basic primary and pioneer, in that means are provided whereby broken stone or other loose material to be pulverized, which has been introduced into a chamber formed by the juxtaposed cavities between two relatively revolving containers, is held in place by the combined action of centrifugal force, and of means acting counter to such force. That is to say, the centrifugal force is opposed by means practically normal or at right angles or abrupt relative to the radius along which the centrifugal force acts, so that the main body of material within each container revolves with its container in a practically firm and rigid mass thus forming two grindstones or the like having adjacent relatively revolving faces that mutually act attritionally upon each other or upon interposed material to effect pulverization of the material at or about the medial plane between said containers which are separated at such plane to allow discharge of the pulverulent product.

It is understood that heretofore it has been proposed to grind or pulverize material by the action of two relatively revolving hollow containers upon the contents of such containers; and this invention is distinguished from all such pulverizers in having means that act in a practical manner to directly intercept the radial or tangential impulse of the material caused by the centrifugal force so as to form two distinct grinding bodies that relatively revolve, each with its own, and not with the other, container; each of the containers being outwardly depended from the axis on which it is revolved, and having a depth of recess at the periphery of the recess which allows the loose material that is fed thereto, to bank up to such a depth against the exterior of the confining wall of the recess, that the body in each recess is given the rigid and practically solid character requisite for action as an independent grinder operating to pulverize material at or about the medial or equatorial plane of the mass of material in the chamber formed by the two juxtaposed recesses.

It is understood that the best results are obtained by providing each container with an annular rim wall, the inside face of which is vertical to such equatorial or medial plane.

The principal object of the invention is to provide a pulverizer in which the material to be ground forms relatively rotating bodies having coacting opposed grinding surfaces that grind each other and fresh material, and are automatically and continuously renewed, as needed, by fresh material.

A further object of the invention is to utilize centrifugal forces to maintain and renew said grinding surfaces.

The invention is particularly new in that it utilizes a container which is so shaped that the material to be ground is packed therein by centrifugal force, thus forming a grinding surface at which the grinding takes place. In the embodiment of the invention disclosed herein, two such grinding members are used, the grinding taking place between these members which rotate in opposite directions.

Another feature of novelty resides in a gradual drawing together of the top and bottom walls of the chamber near the peripheral discharge which is provided through the medium of the space between the rims of the opposite recessed rotating heads.

An object of the invention is to provide a pulverizer that will operate with great efficiency and without such jamming together of the two relatively rotating masses as would cause them to so unite that there would be relative revolution between one or both of the containers and the contents.

An object is to cause relative grinding action between the centrifugally impelled and peripherally restrained masses without jamming or clogging in either wet or dry processes of pulverizing.

A further object of the invention is to provide a machine in which the wear on the machine is minimized and the pulverizing is effected by contact of relatively moving portions of the material to be pulverized and in which the material is quickly discharged when it reaches the fineness required; so that although the machine is adapted to grind material to exceeding fineness for cyaniding and flotation processes of recovery, it may also be reduced to a nearly uniform mesh of any size.

Other objects, advantages and features of novelty may appear from the accompanying drawings, the subjoined detailed description and the appended claims.

The accompanying drawings illustrate the invention.

Figure 1 is an elevation, partly in section, on a straight vertical line, of a machine constructed in accordance with this invention.

Fig. 2 is a detached elevation, partly in section, of the hollow centrally ported shaft detached.

Fig. 3 is an enlarged detail of the opposing rims of the oppositely concaved grinding heads.

Figure 4:
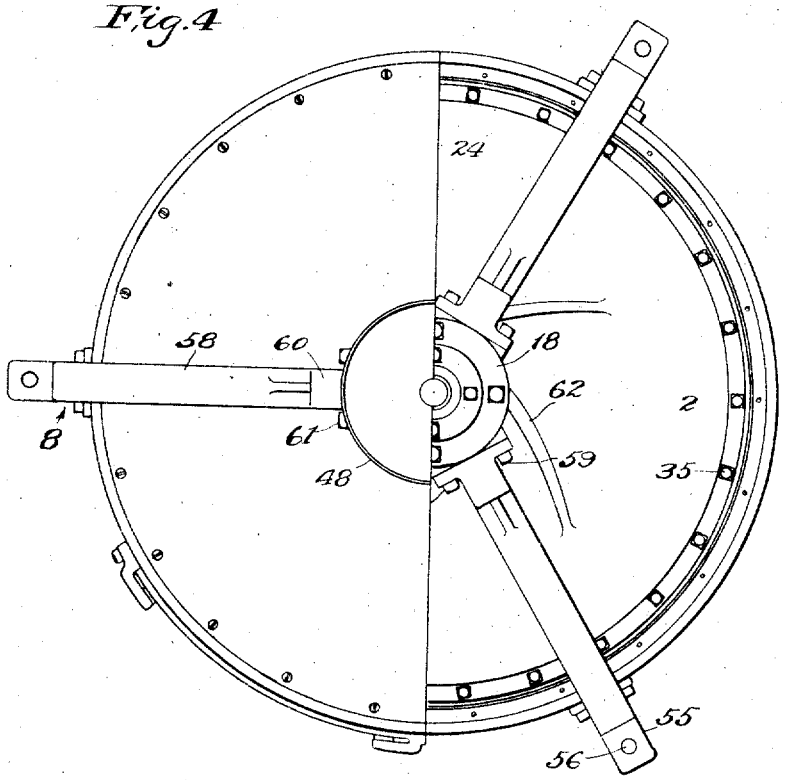
Fig. 4 is a plan of said machine partly in section.
Figure 5:
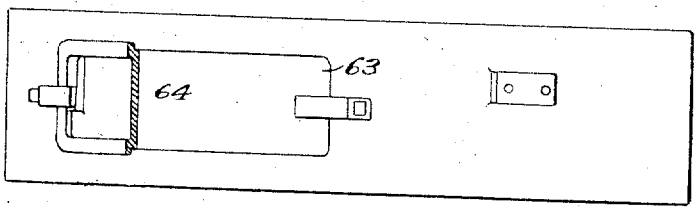
Fig. 5 is a fragmental side elevation of the case or housing detached.

The hollow material holding members are shown as concave heads 1 and 2 that have opposite recessed faces 3 and 4 forming the grinding chamber 4″. The heads 1 and 2 are essentially panshaped, and are outwardly deepened from near the center to near the periphery, and are mounted hollow face to hollow face and revolving, as desired, on the same axis in different directions, or in the same direction at different speeds, or one may be stationary while the other revolves.

It is understood that in case the outwardly deepened chambers formed by heads 1, 2, do not both revolve, the advantages and objects pertaining to this invention are correspondingly reduced and subverted.

By reason of the peripheral depth of the grinding chamber, the material freely travels to and banks up at the periphery of the chamber and thus the grinding is effected by abrasion of the pieces upon each other as they fly outwardly in horizontal planes from the centrifugal impulse imparted to them by the lower revolving head, and they are thus measurably prevented from abrading the heads, the pieces partaking of the rotary motion while being subject to the outward propulsion of centrifugal force and grinding upon each other *en masse* at the periphery of the chamber.

That is to say, the chamber is peripherally deep enough to cause an accumulation of the material which has taken on a rotary motion and become subject to centrifugal force; and such material banks up on to the two peripheral walls that are relatively rotating and two revolving annular masses of broken material are thus formed, and the friction between such masses, respectively, and the peripheries of the rim walls which restrain such masses, respectively from flying outward, is in excess of the friction between the uniting faces of such masses. A principle of the invention is that the rotating pans or containers are so shaped at the periphery thereof that the action of centrifugal force set up in the material by the pans, is directly applied to produce such a friction between the revolving body and its container, that the body will invariably revolve with its container when the container is driven at the proper speed, and thus be transformed into a grinder opposed to the body of broken material contained in the other container, and that a grinding action will be set up and maintained at or about the plane at which the two bodies come into opposition.

The lower head 1 has a removable finished rim 5 and the upper head 2 has an apposite removable finished rim 6. Each of these rims forms at the annular outlet a vertical peripheral wall against which the material will be held by centrifugal force in the operation of the pulverizer. The head 1 is fixed upon the hollow shaft 7 by the key 1 in the key way 7′, and the bore *a* of said shaft 7 terminates within the chamber formed by said heads and is arranged to admit material to said chamber through lateral ports.

Said shaft is mounted in the frame 8 by means of a step bearing 9 and an upper bearing 10 connected to the frame. Said shaft is driven by means of a pulley 11 fixed thereto by a key 12 engaged by screw 13. The head 2 is provided with a hollow arbor 14 journaled by means of the brasses or Babbitt bearings 15, 16 on the hollow shaft 7 and is rotated by means of pulley 17 fixed to said arbor 14. Said hollow arbor is supported by an antifriction thrust-bearing comprising a raceway 18 fixed to the frame 8 and raceway 19 fixed by cap screws 20 to the hollow arbor 14 and antifriction means in the form of balls 21 in said raceway. This bearing is arranged entirely outside of the head 2 and the hollow arbor, and also outside of a housing containing both heads and constructed of an outer annular rim wall 22 having an inside annular deflector 23, and top and bottom annular plates 24, 25, secured to said wall 22 by screws 26, the upper plate 24 being fixed by screws 27 to the raceway 18 and the lower plate 25 being fixed by any suitable means as rivets 28 to a reinforcing ring 29 surrounding the downwardly extending hub 30 of the lower head 1. Means are provided for adjusting the lower head 1 toward and from the upper head 2 and in the form shown the same consists of threads 31 on the shaft 7 below the bottom plate 25 of the housing, and adjusting or set nuts 32, 33, on the threaded portion 31 to support the hub 30 which rests upon the upper set nut 33. By adjusting the nuts 32, 33, up or down, the annular peripheral discharge orifice 34 may be narrowed or widened. Said discharge orifice 34 extends as a narrow slit between the rims 5, 6 entirely around the rotor formed by heads 1, 2, and rims, and may be adjusted to a minute width.

The rims 5, 6 are fixed to their respective heads by cap screws 35 extending through the outer edges of the heads and screwed into the rims 5, 6. Packing held in place by means of a packing ring 37 and cap screws 38 make a tight joint between the supporting shaft 7 and the lower head 1. A collar 39 is fixed by cap screws 40 to a flanged collar 41 having its flange 42 resting on the annular support 44 of the frame 8 and fixed thereto by cap screws 43. Said collar 39 extends inwardly beyond the inner surface of the hollow surface 7 and is internally threaded to receive and support the feed tube 45 that extends down through the hollow shaft 7 and terminates just below the lateral ports 46 thereof, which are located above the level of the lower face of the rim of the upper head 2, so that material fed into the tube 45 will be delivered to the grinding chamber above the level of the peripheral outlet 34 and will be of a diameter less than the depth of either pan from said ports 46 to the rim walls 5, 6.

This arrangement of the port or inlet of the loose broken material relative to the outwardly depended containers establishes for the chamber an outwardly deepened character whereby the material moves freely from the inlet to the revolving mass which is frictionally held by the container to which it becomes practically fixed by the friction induced by the action of centrifugal force.

There is a plurality of the openings 46 so that material may be simultaneously delivered to the grinding chamber from different sides of the rotating hollow shaft 7. The tube 45 prevents the material fed into the machine from coming into contact with the hollow shaft until it reaches the discharge outlets thereof. The shaft is formed with an outwardly sloping surface 47 at the port 46 to allow the material to readily pass outwardly through the opening 46. A hopper 48 is fixed by suitable means as rivets 49 to the top collar 39 so as to deliver the material to tube 45.

The housing wall 22 is fixed by bolts 50 to the frame 8 and is provided with a discharge outlet 51 opening downwardly through the lower plate 25 of said housing. The step bearing may be of any suitable material and is shown as provided with packing or babbitt 52 and the anti-friction plate 53.

The frame may be constructed with three legs having base members 54, having flanges 55 provided with holes 56 through which bolts or cap screws, not shown, may be inserted to fasten the frame to the floor. The legs 57 are bent over inwardly at their upper ends and extend radially toward the center in the form of top beams 58 fixed by cap screws 59 to the lower raceway 18. The upper portions of said legs are bent upward from the beams 58 to form legs 60 of a stand fixed by cap screws 61 to the annular support 44.

The heads 1 and 2 are provided with external fan blades 62, 63 extending from the center toward the rim and adapted to expel air from the center toward the rim of the housing and out through the outlet 51. The concavities forming the grinding chamber are made expanding outwardly except near the rim walls where they curve toward each other and thus direct the material toward the walls and inside of the rims 5, 6, and the friction of the material on the walls of the heads and rims is depended upon to cause each portion of the material to revolve with the head in which it is contained.

In practical operation, the pulleys and grinding heads may be driven in the direction indicated by the arrows thereon, the lower head 1 and pulley 11 rotating in the one direction and the upper head 2 and pulley 17 rotating in the other direction. The material being fed into the hopper descends through the ports 46 into the grinding chamber 4″ formed by the concavities 3 and 4 with the result that the material responsive to the impulses of the rotating shaft is received by the head 1 rotating in the same direction, and travels outward filling the outer portion of the recess 3, and covering the bottom of the inner portion.

Centrifugal force holds the material against the rim walls 5, 6 but the outer oblique edges *a*, *b*, of the concave inner faces of the heads converge toward the vertical walls formed by rims 5, 6, so that centrifugal force causes the material to be fed toward the medial spaces between the heads to effect grinding without jamming or clogging.

As the material is fed into the chamber 4′ such chamber may become entirely filled and in case the heads are reversely rotated the material in the independent recesses 3 and 4 respectively will take on the opposite rotation of the heads 1 and 2 respectively, so that at or about the level of the discharge slit 34 there will be a division between the contents of the chamber, the material in the lower head revolving in the direction of the arrows on said lower head and the upper pulley, and the material in the upper head revolving in the reverse direction as indicated by the arrows on the upper head and the lower pulley.

As a result of this operation the reversely-revolving masses of material at the central plane near the rim walls 5, 6 grind one another and the air contained in the interstices of the mass is driven outward by centrifugal force and expelled through the peripheral discharge slit 34 carrying with it the fine particles which are also centrifugally driven and immediately taken up by the air as they become ground off and are carried by the air to the outlet 51 from whence they may be conducted by any suitable means to any suitable receptacle, not shown.

Whenever it is desired to gain access to the heads the upper cap screws 26 and the cap screws 50 may be removed and the housing wall 22 lowered out of the way. Then the cap screws 35 may be withdrawn from the rims of the heads.

The rim members 5 and 6 may be made of very hard and substantial metal capable of resisting wear and they may be replaced in case of wear by removing the cap screws 35, then slipping out the rims 5, 6 and replacing them with new.

It is obvious that belts or other driving means not shown may be arranged as desired and that the opposite recessed grinding heads 1 and 2 may be thereby rotated as desired, simultaneously in the same direction, or either independently with the other at rest and that the most rapid grinding will occur when the heads are oppositely rotated.

A manhole 63 in the housing wall 22 and a removable manhole cover 64 provide access to the dust chamber 65 in the housing.

In the wet process of pulverizing, water will be fed into the hopper with the material to be pulverized and will be thrown out by centrifugal force, thus washing out the reduced material.

We claim:

1. A pulverizer comprising two hollow members arranged one above the other and forming a chamber and a peripheral outlet from said chamber, means to rotate said members, and means to supply material to the chamber between said members; said chamber increasing in depth outwardly from the supply means to near the periphery and the walls of the chamber being curved toward each other near the periphery.

2. A pulverizer comprising two hollow members forming a chamber and separated to form between them a peripheral outlet from said chamber, means to rotate said members, and means to supply material to the chamber between said members; said chamber being outwardly depended and terminated peripherally by separated vertical walls that stop the material on its outward course.

3. A pulverizer comprising two hollow members forming a chamber and separated to form between them a peripheral outlet from said chamber, means to oppositely rotate said members, and means to supply material to the chamber between said members; said chamber being outwardly deepened above and below the central horizontal plane to near the periphery and then gradually reduced in depth to the periphery and terminated by vertical walls formed by the rims of the chamber to stop the outward flow of the material above and below said central horizontal plane.

4. The combination with a frame, a step bearing and an upper bearing connected to the frame; of a shaft mounted in said bearings and having a bore in its upper portion and lateral ports at the lower end of such bore; a head fixed to the shaft and recessed on its upper face below the level of said ports; a head recessed on its under face and having a hollow arbor extending upward therefrom and journaled on said shaft; means connected with the hollow arbor to rotate the upper head and means connected to the shaft to rotate the lower head; a top collar connected to the frame and a tube connected to said top collar and extending down within the bore of the shaft to allow material to be delivered therethrough to the ports without contact with the walls of the bore.

5. A pulverizer comprising two hollow members arranged one opposite the other and forming a chamber and a peripheral outlet from said chamber, means to rotate said members, and means to supply material to the chamber between said members; the peripheral walls of said chamber being continuous and vertical to the medial plane of said chamber, at the periphery thereof.

6. A pulverizer comprising two hollow members forming a chamber and separated to form between them a peripheral outlet from said chamber, means to rotate said members, and means to supply material to the chamber between said members; said chamber being terminated peripherally by separated continuous vertical walls that operate to stop the material on its outward course.

7. A pulverizer comprising two hollow members forming a chamber and separated to form between them a peripheral outlet from said chamber, means to oppositely rotate said members, and means to supply material to the chamber between said members; said chamber having continuous vertical walls formed by the rims of the chamber to stop the outward flow of the material above and below a central horizontal plane.

8. A pulverizer comprising an upper head; means for rotating said head; a lower head; means for rotating said lower head; each of said heads being panshaped and so placed as to coöperate to form a grinding chamber; and a rim on the outer edge of each of said heads, said rims being so placed as to form a narrow continuous peripheral discharge slit there-between through which the pulverized material is discharged, the inner surface of each of said rims forming a peripheral wall substantially at right angles to the direction of the centrifugal force exerted by the rotation of said heads so that the material to be ground will be held against said walls by said centrifugal force and rotated with said heads respectively thus forming grinding surfaces of the material to be ground between the main bodies of which the grinding action takes place.

9. Two opposed containers arranged to revolve about an axis and means for revolving said containers at the required speed or speeds; said containers so designed with a continuous peripheral wall, that material fed into the chamber formed between such containers will be carried to the interior periphery of such chamber by centrifugal force and thereby held at such periphery in a mass or masses that will revolve with such containers, thus being formed into a crushing or grinding mass or masses that will by being revolved at proper speeds cause such material to crush or grind itself.

10. Two opposed containers revolving in opposite directions and means for revolving said containers; the containers being constructed with continuous, relatively deep peripheral walls so designed that broken or loose material fed into the chamber or cavity between such containers, formed by them will be carried by centrifugal force to that portion of such chamber or cavity farthest from the centers upon which such containers revolve and be held thereby so as to constitute grinding or crushing masses that will be maintained in each of such containers by the action of centrifugal force.

11. A means for forming loose or broken material into grinding or crushing masses by subjecting such material to the action of centrifugal force within containers so designed that such loose or broken material is held practically integral with such containers by the action of centrifugal force thus forming and holding such material into bodies constituting coöperating grinding or crushing masses; means for bringing portions of such masses of material so held into contact with each other for grinding or crushing purposes; means for allowing escape of such material when ground to the desired fineness, and means for renewing same.

12. A pulverizer comprising two relatively rotating oppositely concaved containers forming a chamber adapted to receive between the containers the material to be ground and adapted to set up centrifugal force in such material, said containers having rims that are spaced apart and that are sufficiently abrupt and continuous to peripherally restrain the masses of material therein so as to form two masses that are made rigid by centrifugal force acting upon pieces of broken material to form grinders.

13. A pulverizer comprising opposed rotating containers each of which is so shaped at the periphery thereof that the action of centrifugal force only set up in the material by the container is directly applied to produce such a friction between the revolving body and its container that the body will invariably rotate with the container when the container is driven at the proper speed, and said bodies will thus be transformed into grinders that coöperate to grind material.

14. A pulverizer comprising rotary grinding heads having opposite recessed faces forming a grinding chamber and having opposite rims spaced apart, thereby forming an annular outlet and having continuous walls terminating at the outlet, and vertical to the plane of rotation; means for feeding material to the grinding chamber; means for rotating the heads in opposite directions and means near the periphery to force the material in the chamber toward the separating space.

In witness whereof, we have hereunto set our hands at Los Angeles, California, this 10th day of August, 1918.

JOHN H. MACARTNEY.
JACK MACARTNEY.

Witness:
JAMES R. TOWNSEND.